Sept. 13, 1949.	R. J. BONTHRON ET AL	2,481,494
SHOCK MOUNTING
Filed Oct. 18, 1945	3 Sheets-Sheet 1
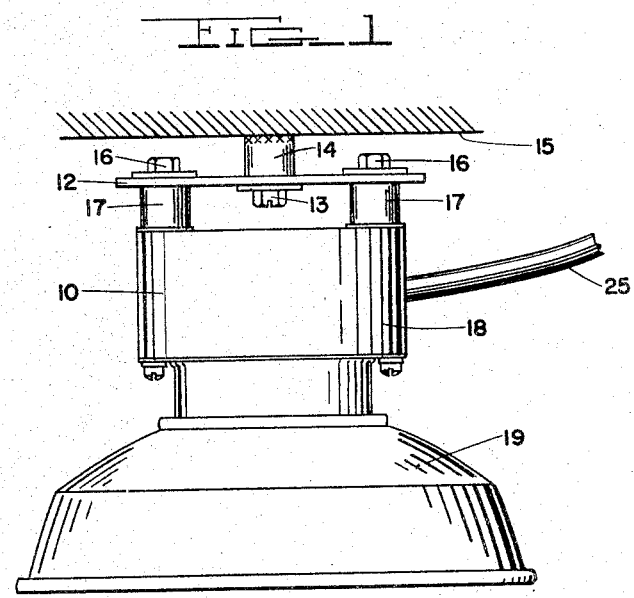
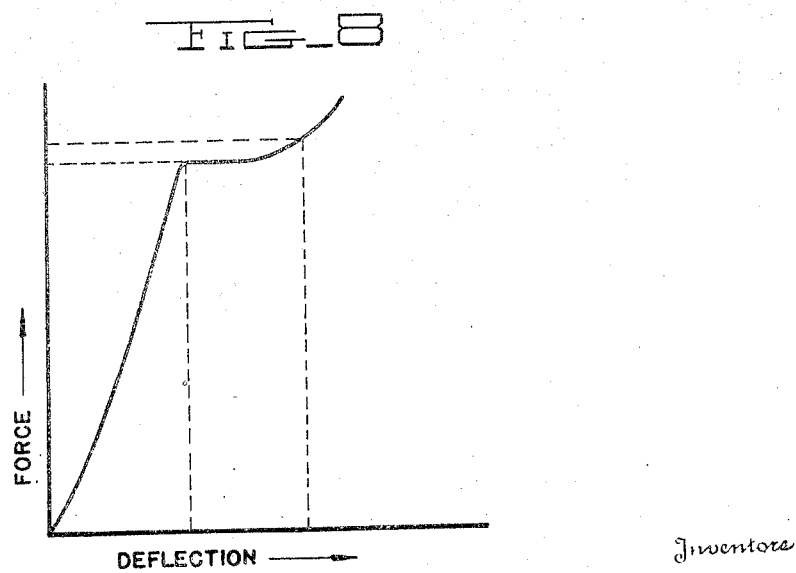
Inventors
ROBERT J. BONTHRON
WILLIAM W. ROSENBERRY
By Ralph L Chappell
Attorney

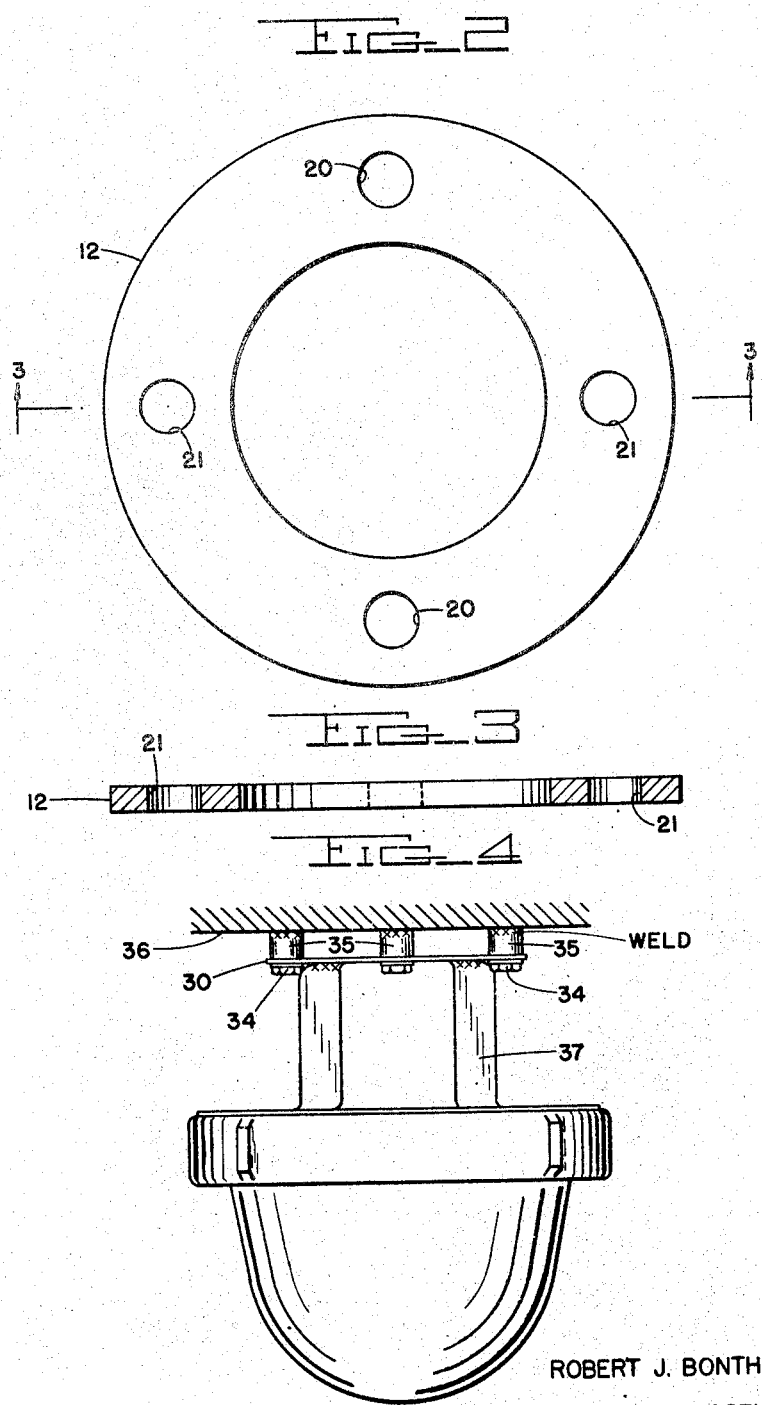

Sept. 13, 1949.　　　R. J. BONTHRON ET AL　　2,481,494
SHOCK MOUNTING
Filed Oct. 18, 1945　　　　　　　　　　　3 Sheets-Sheet 3
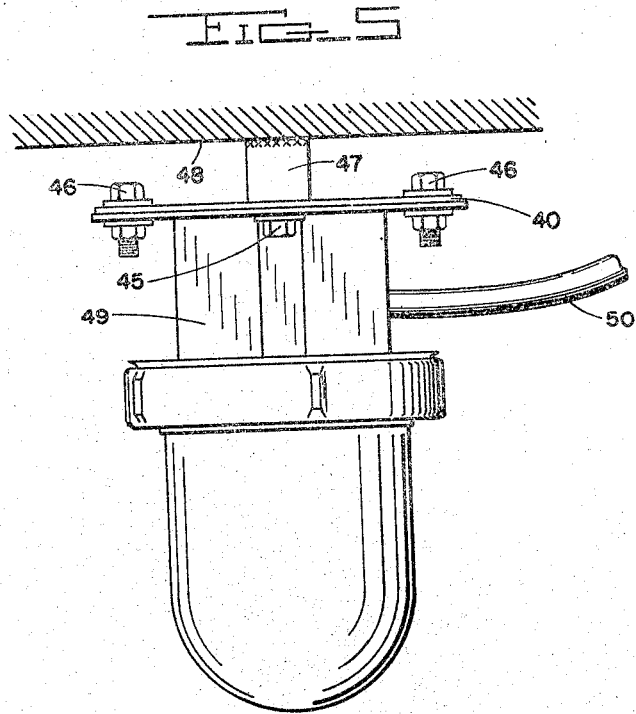
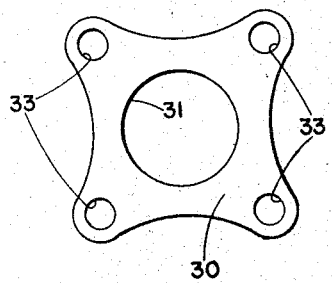
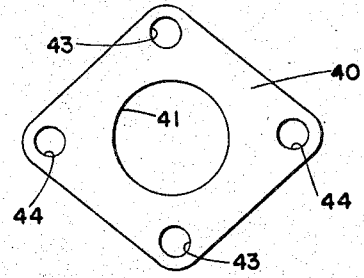
Inventors.
ROBERT J. BONTHRON
WILLIAM W. ROSENBERRY
By Ralph L. Chappell
Attorney Patented Sept. 13, 1949

2,481,494

UNITED STATES PATENT OFFICE 2,481,494

SHOCK MOUNTING

Robert J. Bonthron and William W. Rosenberry,
United States Navy

Application October 18, 1945, Serial No. 623,163

3 Claims. (Cl. 248—358.1)

(Granted under the act of March 3, 1883, as
amended April 30, 1928; 370 O. G. 757)

This invention relates to certain improvements in supporting devices for electric lighting fixtures, lamps and various other devices having delicate components and, more especially, to an improved mounting arrangement which will be capable of protecting such equipment from failure or damage from severe shocks, particularly the transient vibrations of high-intensity mechanical shocks which impart a substantial displacement to the supporting structure on which the fixture or other delicate equipment is used.

It has been found that failure of the lighting fixtures installed on combatant naval vessels, under severe battle conditions, constitute one of the more frequent battle-damage situations experienced aboard such ships. Previous prior art attempts to minimize or reduce such battle-damage difficulties have included the following general methods of limiting displacement across the mount, (A) protecting the lamp filament structure and envelope by isolating it from the base, (B) protecting the entire lamp by mounting the socket upon shock mounts utilizing rubber or helical springs, and (C) combination of both of the above shock protective methods, either in part or the whole. Difficulties which have been encountered in each of the above methods employed, are related to the provision of sufficient shock attenuation and sufficient clearance around any resiliently mounted components to prevent the component from being damaged by collision with an adjacent body. These and other difficulties precluded the successful employment for naval shipboard service of the prior art compression and snubbing systems of shock mountings.

Accordingly, one object of the present invention is to provide an improved shock mount which will be devoid of the above-described difficulties inherent in the prior art shock mounts for supporting the aforesaid equipment.

Another object of the present invention is to provide an improved mount for electric lighting fixtures or for other delicate equipment which will yield readily whenever the supporting structure for such equipment undergoes substantially instantaneous displacement, change of velocity or acceleraton.

Still another object of this invention is the provision of means to limit and retard the extremely high acceleration imparted to the supporting mount upon which a device of the aforesaid class is mounted to a value which can be tolerated safely thereby to reduce the destructiveness of the severe shock forces which would otherwise cause breakage of the structural parts of the supported device.

A further object of the invention is the shock mounting of lighting fixtures at the fixture mounting itself.

A still further object of the invention is the provision of a shock mounting applicable to existing lighting fixtures including base, socket, lamp and dome whereby such components may be retained without change yet permitting modification of the fixture to render the equipment shock resistant.

Another object of the invention is to reduce as far as possible the destruction properties of shock at the bulkhead or overhead mounting of the lighting fixtures.

These and other objects and advantages will appear more fully in the following detailed description, when considered in connection with the accompanying drawings, in which:

Fig. 1 is a side elevation showing an electric light fixture supported by a shock mount in accordance with the invention;

Fig. 2 is a plan view of the shock mounting annulus shown in Fig. 1;

Fig. 3 is a transverse sectional view of the annulus of the construction shown in Fig. 2 taken substantially on the line 3—3 thereof;

Figs. 4 and 5 are other specific embodiments of the invention each showing a lighting fixture supported by a modified form of shock mount element;

Fig. 6 is a plan view of the shock mount plate element employed in the Fig. 4 construction;

Fig. 7 is a plan view of the shock mount plate element employed in the Fig. 5 construction; and Fig. 8 is a diagram useful in explaining the invention.

In the treatment of the problem of rendering ship lighting equipment shock resistant, two feasible methods of approach are open to investigation one plan being to offer some protection in each component of the equipment, thus providing a cumulative build up of shock resistance. This method has possible value when the equipment can be considered as several spring mounted masses in series, in which instance, the weakest component, namely, the electric lamp, is located at the end of the system.

The second method which suggests itself and is adopted in this application is to offer all of the shock protection in one component of the equipment. This method is preferable where some of the components of the lighting fixture nearest the bulkhead or overhead have weaknesses.

It is recognized that shipborne lighting fixtures of naval vessels have more than one component which fails under shock. However, it is further recognized that the immediate result of a high intensity shock force is that certain structural members of the ship suddenly acquire a very high velocity which endures for a sufficiently long time to impart a substantial displacement of these structural members. The motion of these structural members is eventually arrested by other parts of the ship's structure. This results in a reversal of velocity followed by a transient vibration which characterizes the return of the members to their original position in cases of elastic deformation or to some new position in cases of a permanently distorted structure. The sudden acquisition of velocity is characterized by a high acceleration acting for a short time. Since the equipment mounted on these structural members has to be given an equivalent velocity, it also must be given a high acceleration. This acceleration results in extremely high forces in certain structural parts of the equipment; these forces cause breakage which is called shock damage. Accordingly, it is found desirable to reduce or limit as far as possible the destructive properties of the shock force at the fixture mounting itself, namely, at the bulkhead or overhead mounting of the lighting fixture.

It has been discovered in the course of our investigations that under severe shock impact conditions there are four important factors to be considered, viz., maximum deflection, resonant frequency of the lighting fixture, and two damage parameters, viz., the acceleration of the fixture and the rate of change of this acceleration. The principal problem involved therefore is to reduce the transmission of the high acceleration of the bulkhead or overhead mounting and the high rate of change of acceleration thereof.

The acceleration of the fixture is dependent upon and directly proportional to the applied force. Since the fixture is supported only by the mounting and spacers, any force applied to the fixture, and consequently any acceleration, would have to be transmitted through the spacers from the mounting. From elementary mechanics it is known that the deflection of an elastic member, such as a shock mount, is a measure of the force applied to the member and by the member. The force is directly proportional to the deflection up to the elastic limit of the material, and above that varies as the force-deflection curve, as shown in Fig. 8.

When the mounting reaches its maximum deflection, it is exerting its maximum force on the fixture. Therefore when the mounting has its maximum deflection, the fixture has its maximum acceleration. When the mounting has its maximum deflection, its velocity relative to the moving bulkhead is zero. Therefore at this instant the bulkhead, the mounting, and the lighting fixture move as one rigid piece; and so all have the same acceleration. Thus, it is seen that the maximum acceleration of the fixture is equal to the acceleration of the bulkhead at the instant of maximum mounting deflection.

In accordance with the present invention shock mountings are provided which are capable of slightly exceeding the yield point at maximum deflection. This is done so that without appreciably increasing the force exerted on the mounting, increased deflection is obtained and consequently greater time delay before the fixture acceleration equal the bulkhead acceleration. This cumulative time delay permits the bulkhead acceleration to drop from its initial high level at impact to a comparatively low value.

The acceleration-time curve for the shock mounted fixture, from impact to maximum acceleration, is assumed to be approximately linear with a decreased slope where the mounting exceeds the yield point. After the acceleration of the fixture reaches its maximum, the motion of the fixture thereafter becomes a damped sinusoidal vibration. Therefore, the fixture never again reaches its maximum acceleration, thereby minimizes one of the damage parameters. The other damage parameter necessary to protect against is the rapid rate of change of acceleration. The assumption is made that the shock on the bulkhead may be considered as producing a rapid rise of acceleration during the time of impact reaching a constant value and persisting for a short time thereafter. The rate of change of the acceleration is the slope of the acceleration-time curve or $da/dt$. For a steep acceleration curve, the value of the slope would decrease from infinity.

According to the present invention the fixture is protected from this high rate of change of acceleration by modification of the acceleration-time curve of the fixture. During the first instants of shock, while the panel or bulkhead has a large value of acceleration, the force is not being transmitted directly to the fixture, but is producing the deflection and deformation of the mounting element. The effect of the mounting is to produce sinusoidal motion of the fixture. Due to the sinusoidal motion, the shape of the acceleration-time curve is essentially a sine-wave function. Therefore, throughout the entire motion, the slope of the acceleration-time curve (rate of change of acceleration) being also a sine function never reaches the high value of rate of change of acceleration that the bulkhead or overhead has under shock.

In carrying out the present invention into practice, various types of mountings employing interposed supporting elements of various contours including annular shapes, all of which present a large circular hole, and providing a beam effect, are employed so that the destructive effects of shock will be eliminated by the mounting whereby ample flexibility is obtained in all directions. Flexibility in all directions can be varied by changing the dimensions of the annulus. Flexibility in the plane parallel to the mounting can be varied by changing the length of the spacers between the mountings and fixture.

As above stated, an important feature of the invention lies in the discovery of the fact that protection from the severe and destruction effects of shock is obtained by providing metal fixture supporting elements of a material which is capable of exceeding the yield point of the metal used for such a mounting element. In practice, it has been found that a support element in the form of a sheet metal member or plate made from a steel with properties similar to those of hot rolled steel will provide a fixture mounting having the characteristics desired; and that it is most important that the yield point of the mountings be close to that of hot rolled steel.

The following is the chemical analysis of hot rolled steel which has been found satisfactory in the construction of the mountings of this invention:

Table I

| Element: | Percent |
|---|---|
| C | 0.04 |
| Mn | 0.35 |
| Mo | 0.01 |
| Cr | 0.04 |
| Ni | 0.03 |

The above hot rolled steel has the following physical analysis:

Yield point _____ 35,500–38,000 pounds/sq. in.
Percent elongation_ 27.5%–29.0% (for an 8 inch gauge length)

While mounting elements made from steel with properties varying from the above will be a considerable improvement over unmounted fixtures, they will not give the degree of protection obtainable with the above steel.

Each satisfactory mounting and fixture combination has a characteristic natural frequency, static moment and moment of inertia of the cross-sectional area of the particular annulus employed. Any appreciable variation in any one of these will render the combination ineffective or less effective. Any looseness in the system is undesirable because it tends to be cumulative and also permits excessive deflections of the fixture and components and so would have a deleterious effect on the overall performance of the fixture.

Referring to Fig. 1 of the drawings, the vibrating member comprises an electric lighting fixture which is designated generally by reference numeral 10, and is there shown as mounted in an association of elements in which the novel qualities of the supporting element 12 are of particularly great advantage. This mounting arrangement includes bolts 13 and tubular spacers 14 arranged to rigidly secure the supporting element 12 in a suspended relationship to a metal overhead support means or bulkhead 15, while bolts 16 and tubular spacers 17 rigidly secure the base 18 and the lower members of the lighting fixture including the dome 19 in a suspended position from the mounting element 12. The spacers 14 are rigidly affixed to the support 15, as by welding thereto. The mounting element 12 employed in Fig. 1 has the annular form shown in Figs. 2 and 3 and is provided with suitable bolt holes 20 and 21 for the bolts 13 and 16 respectively. The annular plate 12 is made of hot rolled steel sheet material, and the dimensions of this plate is made such that it extends well beyond the points of attachment of the lighting fixture 10 at each side a distance sufficient to permit the slower vibration of the support 12 to counteract the higher vibrations produced in the overhead 15 during the transmission of the rapidly accelerated high intensity shocks whereby to cause the resultant vibrations to be substantially nondestructive. Thus, the bolts 13 and 16 provide a two point suspension of the annulus 12 from the overhead 15 and with respect to the lighting fixture 10 mounted upon the annulus, and the arrangement of the spacers 14 and 17 is such that the fixture is held far enough away from the annulus 12 to permit free bending or twisting of the annulus within or somewhat beyond its elastic limit without causing collison between the parts undergoing relative motion.

Suitable dimensions for certain of the annular mounting plates which have been employed in various practical embodiments of the shock mounting described above have been found to be as follows:

Table II

| Outer Dia. | Inner Dia. | Material |
|---|---|---|
| 4 5/16 inches | 2 7/16 inches | #16 gauge (.062") hot rolled steel. |
| 4 1/2 inches | 2 1/4 inches | #16 gauge (.062") hot rolled steel. |
| 4 7/8 inches | 2 1/4 inches | #14 gauge (.078") hot rolled steel. |
| 4 3/8 inches | 2 3/8 inches | #13 gauge (.095") hot rolled steel. |

The physical properties of the hot rolled steel used should have the following optimum properties:

Yield strength _____ 34,000 to 38,000 p. s. i.
Percent elongation _____ 22.0%–27.0% (for an 8 inch gauge length)
Percent elongation _____ 33.0%–40.0% (for a 2 in. gauge length)

Electrical connection to the lighting fixture may be made at a suitable point in the fixture by means of cable 25, as is a well known arrangement in the art.

Certain specific modifications of the invention are illustrated in Figs. 4 and 5 of the drawings. In Fig. 4 there is shown a magazine type of fixture in which the mounting plate or supporting element 30 corresponding to the above described mounting 12, is of the four-cusp contour shown in Fig. 6, and has a large central hole 31 and a bolt hole 33 in each cusp through which pass suitable bolts 34 rigidly securing the mounting element 30 to spacers 35 which, in turn, are rigidly secured, as by welding, to the overhead support or bulkhead 36. The lighting fixture 37 itself is rigidly affixed to the mounting plate 30 as by welding thereto. The mounting plate 30 consists of hot rolled sheet stock having the physical and chemical properties listed in Table I.

In Fig. 5 there is shown a deck type of lighting fixture in which the supporting element 40 is of the form shown in Fig. 7 consisting of a generally diamond-shaped hot rolled sheet plate member having a large central hole 41 and provided with bolt holes 43 and 44 at diametrically opposite corners through which suitable bolts 45 and 46 pass for rigidly securing the mounting plate 40 to spacers 47 which are welded to the overhead or bulkhead 48 and to the lighting fixture 49, respectively. Cable 50 connected at a suitable point in the fixture provides electrical connection to the lighting fixture.

Various other modifications may be made in the arrangement going to make up the novel shock mount of this invention without departing from the spirit of the invention as defined in the appended claims.

The invention described herein may be manufactured and used by or for the Government of the United States of America for governmental purposes without the payment of any royalties thereon or therefor.

What is claimed is:

1. A shock mounting construction comprising a supporting member in the form of a plate composed of hot rolled sheet steel having a yield strength corresponding to a stress range from 34,000 to 38,000 pounds per square inch and a percentage elongation from 22.0 to 27.0% for an eight inch gauge length, rigid means holding said plate substantially parallel to a shock-transmitting surface, said means being rigidly secured to said surface, and rigid means supporting a lighting fixture including an electric lamp from said support plate.

2. A shock mounting construction comprising a supporting member in the form of a flat plate composed of hot rolled sheet steel having a yield point corresponding to a stress range from 34,000 to 38,000 pounds per square inch and a percentage elongation from 22.0 to 27.0% for an eight inch gauge length, bolt and spacer means supporting said plate parallel to a shock transmitting surface, said means being rigidly secured to said shock transmitting surface, and bolt and spacer means rigidly securing a lighting fixture to said plate.

3. A shock mounting construction comprising a fixed support, a vibrating fixture and an intermediate supporting element rigidly secured to said support and to said fixture wherein said supporting element is characterized by being in the form of a plate member composed of hot rolled steel having a yield strength corresponding to a stress range from 34,000 to 38,000 pounds per square inch, and a percentage elongation which for an eight inch gauge length is from 35.0% to 40.0%.

ROBERT J. BONTHRON.
WILLIAM W. ROSENBERRY.

REFERENCES CITED

The following references are of record in the file of this patent:

UNITED STATES PATENTS

| Number | Name | Date |
|---|---|---|
| 1,426,751 | McGall et al. | Aug. 22, 1922 |
| 1,533,210 | Radu | Apr. 14, 1925 |
| 1,821,406 | Sewin | Sept. 1, 1931 |
| 2,442,754 | Beam | June 8, 1948 |

FOREIGN PATENTS

| Number | Country | Date |
|---|---|---|
| 313,871 | Great Britain | Apr. 23, 1929 |